United States Patent Office 3,149,139
Patented Sept. 15, 1964

3,149,139
STABILIZATION OF ORGANIC ISOCYANATES
Ernst Meisert, Leverkusen, Germany, assignor to Farbenfabriken Bayer Aktiengesellschaft, Leverkusen, Germany, a corporation of Germany
No Drawing. Filed Sept. 8, 1960, Ser. No. 54,589
Claims priority, application Germany Sept. 17, 1959
11 Claims. (Cl. 260—453)

This invention relates to organic compounds and more particularly to the stabilization of organic isocyanates against discoloration.

Isocyanates and particularly polyisocyanates are important as starting materials for the production of plastics by the isocyanate-polyaddition process. Organic isocyanates are generally colorless liquids or solids which tend to become discolored on storage. This is particularly true of toluylene diisocyanate. On storage, the isocyanates change from colorless to a light yellow and in extreme cases to a brown color. Although this discoloration can generally be removed by distillation, the distillate will again become discolored on storage.

The discoloration which occurs presents a serious problem where colorless or light colored reaction products are to be produced as it is impractical to distill the isocyanates immediately before carrying out the polyaddition process.

It has been heretofore known that discoloration of organic isocyanates can be prevented by adding thereto 0.1 to 5% of a phenol substituted by tertiary α-alkyl or α-alkyl cycloalkyl radicals such as, for example, 2-α-methyl cyclohexyl-4,6-dimethyl phenol or 2,6-di-tertiary-butyl-4-methyl phenol if the products are stored with the exclusion of light.

It has also been known to stabilize organic isocyanates against discoloration by incorporating therein pyrogallo-1,3-dimethyl ether. This stabilizer, in contrast to the stabilizers described herein, does not readily react with the isocyanate to be stabilized. The new stabilizers exert their effect while being anchored to one of the isocyanate molecules to be stabilized. At elevated temperature, however, they are split off the isocyanate molecule. They are volatile with the isocyanate and when the isocyanate is distilled, they protect even the isocyanate vapour as well as the newly condensed distillate.

It is, therefore, an object of this invention to provide a simple method for stabilizing organic isocyanates against discoloration. It is another object of this invention to provide organic isocyanates which do not become discolored even after long storage periods.

The foregoing objects and others which will become apparent from the following description are accomplished in accordance with the invention generally speaking, by providing, a method of stabilizing organic isocyanates against discoloration wherein there is incorporated in the organic isocyanate from about 0.001 percent to about 1 percent by weight of the organic isocyanate, a compound substantially soluble in the isocyanate and represented by the following formula:

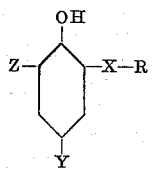

wherein X is oxygen or sulphur; R is a primary, secondary or tertiary alkyl radical or a trialkyl silyl group; Y represents hydrogen or an alkyl or alkenyl radical and Z is hydrogen or:

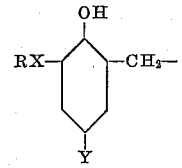

wherein R, X and Y have the same meaning as above. The stabilized isocyanate is then stored with the exclusion of light, for example, in metal casts or cans which is the standard, general and practical method and which is used in almost every case.

As stated generally above, R is any primary, secondary or tertiary alkyl radical such as, for example, methyl, ethyl, n-propyl, isopropyl, n-butyl, isobutyl, sec. butyl, t-butyl, n-amyl, and various positional isomers thereof such as, for example, 1-methyl butyl, 2-methyl butyl, 3-methyl butyl, 1,1-dimethyl propyl, 1,2-dimethyl propyl, 2,2-dimethyl propyl, 1-ethyl propyl and the like; corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like. Of course, any of the alkyl radicals listed may also form alkyl groups of the trialkyl silyl group which is also represented by R. As stated above, Y represents hydrogen, alkyl or alkenyl radicals. Any of the alkyl radicals stated above are suitable. Any alkenyl radical such as, for example, ethenyl, 1-propenyl, 2-propenyl, isopropenyl, 1-butenyl, 2-butenyl, 3-butenyl; corresponding branched chain isomers thereof such as, for example, 1-isobutenyl, 2-isobutenyl, 1-sec-butenyl, 2-sec-butenyl including 1-methylene-2-propenyl, 1-pentenyl, 2-pentenyl, 3-pentenyl, 4-pentenyl; corresponding branched chain isomers thereof such as, for example, 1-hexenyl, 2-hexenyl, 3-hexenyl, 4-hexenyl, 5-hexenyl; corresponding branches chain isomers thereof such as, for example, 3,3-dimethyl-1-butenyl, 2,3-dimethyl-1-butenyl, 2,3-dimethyl-2-butenyl, 2,3-dimethyl-3-butenyl, 1-methyl-1-ethyl-2-propenyl; and the various isomers of heptenyl, octenyl, nonenyl, decenyl, undecenyl, dodecenyl, tridecenyl, tetradecenyl, pentadecenyl, hexadecenyl, heptadecenyl, octadecenyl, nondecenyl, eicosenyl may be used.

The stabilizing agents provided in accordance with this invention are substantially soluble in the organic isocyanates which are normally liquids and can be readily dissolved in organic isocyanates which are solids at normal temperatures by incorporating the stabilizer into the isocyanate, while the isocyanate is in the molten form. The stabilizing agents may be used in any quantities and generally are used in quantities of from about 0.001 percent to about 1 percent by weight based on the weight of the organic isocyanate and preferably from about 0.01 percent to about 1 percent by weight. Specific examples of compounds within the generic formula set forth above include for example guaiacol, creosol, eugenol, isoeugenol, 2,2'-dihydroxy-3,3'-dimethoxy-5,5'-dimethyl diphenyl methane, pyrocatechol monoisopropyl ether, pyrocatechol monotertiary-butyl ether, 2,2'-dihydroxy - 3,3' - bis - mercaptomethyl - 5,5' - dimethyl diphenyl methane and 2-hydroxyphenoxy trimethyl silane.

The process of this invention is suitable for the stabilization of all organic monovalent or polyvalent isocyanates against discoloration including such as, for example, aliphatic, cycloaliphatic, or aromatic isocyanates. Typical isocyanates which may be used are propyl isocyanate, tertiary butyl isocyanate, stearyl isocyanate, cyclohexyl isocyanate, phenyl isocyanate, o-, m-, p-tolyl isocyanate, naphthyl isocyanate, xenyl isocyanate, benzyl isocyanate, xylyl isocyanate, mesityl isocyanate, cyclohexyl isocyanate, cyclohexadienyl isocyanate, cyclobutenyl isocyanate, furfuryl isocyanate, tetramethylene diisocyanate, hexamethylene diisocyanate, propylene diisocyanate, ethylidene diisocyanate, cyclohexylene diisocyanates, p-phenylene diisocyanate, 2,4- and 2,6-toluylene diisocyanates, 1-methoxy-benzene-2,4-diisocyanate, 1-chlorobenzene-2,4-diisocyanate, 1-nitrobenzene-2,4-diisocyanate, xylylene diisocyanate, diphenyl ether-4,4'-diisocyanate, 1,4- and 1,5-naphthylene diisocyanates, diphenyl-4,4'-diisocyanate, diphenyl methane-4,4'-diisocyanate, diphenyl dimethyl methane-4,4'-diisocyanate, azobenzene-4,4'-diisocyanate, diphenylsulfone-4,4'-diisocyanate, dichlorohexyl methane-4,4'-diisocyanate, furfurylidene diisocyanate, 2,4,4'-triisocyanato diphenyl ether, toluene-2,4,6-triisocyanate, 1-methoxybenzene-2,4,6-triisocyanate, triphenyl methane-4,4',4''-triisocyanate, tetraphenyl methane-4,4',4'',4'''-tetraisocyanate and the like.

The process of this invention is also suitable for reducing the discoloration of low molecular weight reaction products of monomeric isocyanates containing free isocyanate groups such as, for example, dimeric diisocyanates, the reaction products of polyhydric alcohols with an excess of diisocyanates such as, the reaction product of one mol of trimethylol propane and three mols of a diisocyanate such as 2,4- or 2,6-tolylene diisocyanate and also biuret polyisocyanates such as those obtained by the process disclosed in copending U.S. patent application Serial No. 806,444. The stabilizing agents do not have to be added to final reaction products of the above-mentioned low molecular weight products, but they can also be introduced into the monomeric isocyanates which are used for the production of the products.

A particular advantage of the process of this invention is that it is possible to work with compounds which are readily available and above all with very small quantities of these compounds.

Of course, it is well known that isocyanates are particularly advantageous in the preparation of polyurethane plastics which may be either porous or non-porous products. Porous polyurethane plastics are particularly adapted for use in the furniture industry such as, cushions, upholstered units of all types, in the automotive industry for topper pads, crash pads, arm rests and the like; as insulating materials and recently as a decorative covering. Non-porous elastomeric polyurethanes find particular use as shock absorbing parts in all types of machinery units such as shock absorbers in automotive motor mounts and the like and for use in other applications such as gears, door stoppers, diaphragms, driving belts for machinery units and the like.

The invention is further illustrated by the following examples.

*Example 1*

To freshly distilled technical tolyl isocyanate is admixed 1 gram of guaiacol for each 1000 grams of the isocyanate. The material is then stored for a period of 6 weeks and the discoloration of the specimen is measured by a brightness comparator (Gardner scale I). A comparison specimen without the addition of guaiacol shows a color factor of 8 while the specimen 0.1 percent of guaiacol has a color factor of 1.

*Example 2*

To about 100 grams of a freshly distilled o-tolyl diisocyanate having a color factor of 1 is admixed 0.5 gram of guaiacol. No discoloration of the specimen is apparent after storage for 6 weeks. Whereas a comparison sample having no guaiacol added thereto exhibits a color factor of 5.

*Example 3*

The stabilizing agents set forth in the following table in the percentages indicated are dissolved by mixing in a freshly distilled technical mixture of 2,4- and 2,6-toluylene diisocyanates in a ratio of 65:35. The discoloration is then measured after one day and after twenty-one days to compare the effect of the stabilizing agents used on the isocyanate. This data is listed on the following table for the different stabilizing agents.

| Stabilizer | Concentration, Percent | Color After One Day | Color After 21 Days |
|---|---|---|---|
| Without stabilizer | 0 | 1 | 3 |
| Guaiacol | 1.0 | 1 | 1 |
|  | 0.1 | 1 | 1 |
|  | 0.01 | 1 | 1 |
| Eugenol | 1.0 | 1 | 1-2 |
|  | 0.1 | 1 | 1 |
|  | 0.01 | 1 | 1 |
| Iso-eugenol | 1.0 | 1 | 2 |
|  | 0.1 | 1 | 1 |
|  | 0.01 | 1 | 1 |
| 1-hydroxy-2-methoxy-4-methyl benzene | 1.0 | 1 | 1 |
|  | 0.1 | 1 | 1 |
|  | 0.01 | 1 | 1 |
| Bis-(2-hydroxy-3-methoxy-5-methylphenyl)-methane | 1.0 | 1 | 1 |
|  | 0.1 | 1 | 1 |
|  | 0.01 | 1 | 1 |
| Bis-(2-hydroxy-3-mercaptomethyl-5-methylphenyl)-methane | 1.0 | 1 | 1 |
|  | 0.1 | 1 | 1 |
|  | 0.01 | 1 | 1 |
| 2-isopropoxyphenol | 1.0 | 1 | 1 |
|  | 0.1 | 1 | 1 |
|  | 0.01 | 1 | 1 |
| 2-hydroxyphenoxy trimethyl silane | 1.0 | 1 | 1 |
|  | 0.1 | 1 | 1 |
|  | 0.01 | 1 | 1 |

*Example 4*

About 0.05 part by weight of guaiacol is dissolved by mixing in 100 parts by weight of hexamethylene diisocyanate. The solution is then heated in a reaction vessel consisting of chrome, nickel and steel to a temperature of 98° C. to 100° C. About 2.2 parts by weight of water are added dropwise to the hot isocyanate. After about 10 hours the temperature has risen to about 140° C. and is maintained at this temperature for about 5 hours. Thereafter the unreacted hexamethylene diisocyanate is removed in a thin film evaporator. There remains a viscous biuret polyisocyanate having a color factor of 3 which is suitable for use as a lacquer resin.

In a comparison specimen where no addition of guaiacol was made to the isocyanate, a resin having a color factor of 8 is obtained. This strong discoloration renders the resin useless as a lacquer.

*Example 5*

The stabilizer is dissolved in a freshly distilled technical mixture of 2,4- and 2,6-toluylene diisocyanate (65:35). The effect of the stabilizer is found to be as follows:

| Stabilizer | Concentration, Percent | Colour after one day | Colour after 28 days |
|---|---|---|---|
| Without stabilizer | 0 | 1 | 2 |
| 1-methyl-4-hydroxy-5-methyl-mercapto-benzene | 1 | 1 | 1 |
|  | 0.1 | 1 | 1 |
|  | 0.01 | 1 | 1 |
|  | 0.001 | 1 | 1 |

*Example 6*

Crude 4,4'-diisocyanato diphenyl methane is distilled after addition of 0.3% of guaiacol. After 60 days' storage a sample shows in melted condition the colour factor 2. A comparison sample without stabilizer shows a colour factor of 3–4. Another sample is distilled after addition of 0.3% 2-hydroxy-phenoxy trimethyl silane. The sample is colourless (colour factor 1) even after 60 days' storage.

Of course, any of the organic isocyanates listed above may be stabilized against discoloration by the process of this invention and can be substituted into the working examples for the particular isocyanates used therein. Also any of the stabilizing agents listed above and represented by the general formula may be used in the working examples.

Although the invention has been described in considerable detail for the purpose of illustration, it is to be understood that variations may be made therein by those skilled in the art without departing from the spirit of the invention and the scope of the claims.

What is claimed is:

1. An organic isocyanate selected from the class consisting of aliphatic, cycloaliphatic and aromatic isocyanates, being stabilized against discoloration by having dissolved therein from about 0.001% to about 1% by weight based on the isocyanate of a member selected from the group consisting of guaiacol, creosol, eugenol, isoeugenol, 2,2' - dihydroxy - 3,3' - dimethoxy - 5,5' - dimethyl diphenyl methane, pyrocatechol monoisopropyl ether, pyrocatechol monotertiary-butyl ether, 2,2'-dihydroxy-3,3'-bis-mercaptomethyl-5,5'-dimethyl diphenyl methane and 2-hydroxyphenoxy trimethyl silane.

2. A process for stabilizing organic isocyanates selected from the class consisting of aliphatic, cycloaliphatic and aromatic isocyanates against discoloration which comprises dissolving therein from about 0.001% to about 1% by weight based on the isocyanate of a compound selected from the group consisting of guaiacol, creosol, eugenol, isoeugenol, 2,2'-dihydroxy-3,3'-dimethoxy-5,5' - dimethyl diphenyl methane, pyrocatechol monoisopropyl ether, pyrocatechol monotertiary-butyl ether, 2,2'-dihydroxy-3,3'-bis-mercaptomethyl-5,5'-dimethyl diphenyl methane and 2-hydroxyphenoxy trimethyl silane.

3. An organic isocyanate selected from the class consisting of aliphatic, cycloaliphatic and aromatic isocyanates, being stabilized against discoloration by having dissolved therein from about 0.001 percent to about 1 percent by weight based on the isocyanate of a compound having the formula:

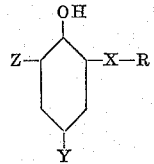

wherein X is selected from the group consisting of oxygen and sulphur; R is selected from the group consisting of primary alkyl, secondary alkyl, tertiary alkyl and trialkyl silyl; Y is selected from the group consisting of hydrogen, alkyl and alkenyl radicals and Z is selected from the group consisting of hydrogen and a radical having the formula:

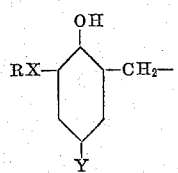

wherein R, X and Y have the same meaning as above.

4. An organic isocyanate selected from the class consisting of aliphatic, cycloaliphatic and aromatic isocyanates, being stabilized against discoloration having dissolved therein from about 0.001 percent to about 1 percent by weight based on the isocyanate of guaiacol.

5. An organic isocyanate selected from the class consisting of aliphatic, cycloaliphatic and aromatic isocyanates, being stabilized against discoloration having dissolved therein from about 0.001 percent to about 1 percent by weight based on the isocyanate of eugenol.

6. An organic isocyanate selected from the class consisting of aliphatic, cycloaliphatic and aromatic isocyanates, being stabilized against discoloration having dissolved therein from about 0.001 percent to about 1 percent by weight based on the isocyanate of a 2-alkoxy phenol.

7. A process for stabilizing organic isocyanates selected from the class consisting of aliphatic, cycloaliphatic and aromatic isocyanates against discoloration which comprises dissolving therein from about 0.001 percent to about 1.0 percent by weight based on the isocyanate of a compound having the formula:

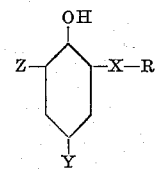

wherein X is selected from the group consisting of oxygen and sulphur; R is selected from the group consisting of primary alkyl, secondary alkyl, tertiary alkyl and trialkyl silyl; Y is selected from the group consisting of hydrogen, alkyl and alkenyl radicals and Z is selected from the group consisting of hydrogen and a radical having the formula:

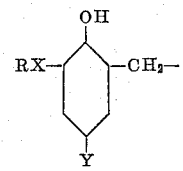

wherein R, X and Y have the same meaning as above.

8. A process for stabilizing oragnic isocyanates selected from the class consisting of aliphatic, cycloaliphatic and aromatic isocyanates against discoloration which comprises dissolving therein from about 0.001 percent to about 1.0 percent by weight based on the isocyanate of guaiacol.

9. A process for stabilizing organic isocyanates selected from the class consisting of aliphatic, cycloaliphatic and aromatic isocyanates against discoloration which comprises dissolving therein from about 0.001 percent to about 1.0 percent by weight based on the isocyanate of eugenol.

10. A process for stabilizing organic isocyanates selected from the class consisting of aliphatic, cycloaliphatic and aromatic isocyanates against discoloration which comprises dissolving therein from about 0.001 percent to about 1.0 percent by weight based on the isocyanate of a 2-alkoxy phenol.

11. A process for stabilizing organic isocyanates selected from the class consisting of aliphatic, cycloaliphatic and aromatic isocyanates against discoloration which comprises dissolving therein from about 0.001 percent to about 1.0 percent by weight based on the isocyanate of 2-hydroxy phenoxy trimethyl silane.

References Cited in the file of this patent

UNITED STATES PATENTS

| | | |
|---|---|---|
| 2,885,420 | Spiegler | May 5, 1959 |
| 2,950,307 | France et al. | Aug. 23, 1960 |